US011565812B2

(12) United States Patent
McArthur

(10) Patent No.: US 11,565,812 B2
(45) Date of Patent: Jan. 31, 2023

(54) PAYLOAD ACTIVATION DEVICE

(71) Applicant: BAE Systems plc, London (GB)

(72) Inventor: Gordon John Victor McArthur, Preston (GB)

(73) Assignee: BAE Systems plc, London (GB)

( * ) Notice: Subject to any disclaimer, the term of this patent is extended or adjusted under 35 U.S.C. 154(b) by 260 days.

(21) Appl. No.: 17/049,377

(22) PCT Filed: May 1, 2019

(86) PCT No.: PCT/GB2019/051210
§ 371 (c)(1),
(2) Date: Oct. 21, 2020

(87) PCT Pub. No.: WO2019/220077
PCT Pub. Date: Nov. 21, 2019

(65) Prior Publication Data

US 2021/0188439 A1 Jun. 24, 2021

(30) Foreign Application Priority Data

May 17, 2018 (EP) .................................... 18172968
May 17, 2018 (GB) .................................... 1808008

(51) Int. Cl.
*B64D 1/06* (2006.01)
*F42B 10/56* (2006.01)
*F42C 13/00* (2006.01)

(52) U.S. Cl.
CPC ................ *B64D 1/06* (2013.01); *F42B 10/56* (2013.01); *F42C 13/006* (2013.01)

(58) Field of Classification Search
CPC ........ F42B 10/56; F42B 39/30; F42C 13/006; F42C 15/23
See application file for complete search history.

(56) References Cited

U.S. PATENT DOCUMENTS 2,377,587 A * 6/1945 Strong .................... F42B 10/56 89/1.51
3,351,017 A * 11/1967 Myers .................. F42C 15/188 102/254
3,625,106 A 12/1971 Russo et al.
3,713,387 A 1/1973 Karp
(Continued)

FOREIGN PATENT DOCUMENTS

FR 2919269 A1 1/2009
GB 985229 A1 3/1965
(Continued)

OTHER PUBLICATIONS

International Search Report and Written Opinion for PCT Patent Appl. No. PCT/GB2019/051210, dated Jun. 4, 2019, 13 Pages.
(Continued)

*Primary Examiner* — Christopher D Hutchens
(74) *Attorney, Agent, or Firm* — Maine Cernota & Rardin

(57) ABSTRACT

When the tension across the cord's 24 length reaches a predetermined threshold, an activation mechanism within the payload 16 and coupled to one of the cord's 24 ends is actuated in order to activate the payload 16. Activating the payload 16 may include deactivating a SAFU, activating a motor 32 disposed within the housing, or causing flight controls to extend from a housed position. Here, "within the payload 16" may mean part of the activation mechanism is disposed on the outer surface or housing of the payload 16.

6 Claims, 5 Drawing Sheets

10
24
22
16
20

(56) References Cited

U.S. PATENT DOCUMENTS

| | | | | |
|---|---|---|---|---|
| 3,797,394 A * | 3/1974 | Thurston | F42B 12/70 102/357 |
| 4,478,127 A | 10/1984 | Hennings | |
| 4,488,489 A * | 12/1984 | Schoffl | F42B 12/58 102/350 |
| 4,662,278 A | 5/1987 | Lillios | |
| 5,370,057 A * | 12/1994 | Badura | F42B 12/625 102/377 |
| 5,386,781 A | 2/1995 | Day | |
| 5,467,681 A * | 11/1995 | Liberman | F42B 10/56 244/3.1 |
| 7,137,599 B1 | 11/2006 | Stizmann | |
| 8,371,535 B2 | 2/2013 | Grabmeier et al. | |
| 8,430,031 B1 | 4/2013 | Thorniley et al. | |
| 2008/0110364 A1 | 5/2008 | Richards et al. | |
| 2010/0070674 A1 | 3/2010 | Campbell | |
| 2010/0282893 A1 | 11/2010 | Roemerman | |
| 2012/0150365 A1 | 6/2012 | Maxwell | |
| 2012/0291613 A1 | 11/2012 | Rastegar | |
| 2017/0082408 A1 | 3/2017 | Thompson et al. | |

FOREIGN PATENT DOCUMENTS

| | | |
|---|---|---|
| GB | 1603227 A | 11/1981 |
| WO | 2006134370 A | 12/2006 |
| WO | 2010031377 A2 | 3/2010 |
| WO | 2012162381 A1 | 11/2012 |
| WO | 2015149108 A1 | 10/2015 |
| WO | 2018063076 A1 | 4/2018 |

OTHER PUBLICATIONS

Search Report for European Patent Appl. No. 18172968.2, dated Jul. 31, 2018, 8 Pages.

Search Report for Great Britain Appl. No. 1808008.5, dated Nov. 15, 2018, 4 Pages.

Search Report for European Patent Appl. No. 18172966.6, dated Oct. 10, 2018, 5 Pages.

Search Report for Great Britain Appl. No. 1808017.6, dated Nov. 19, 2018, 4 Pages.

International Search Report and Written Opinion for PCT Appl. No. PCT/GB2019/051209, dated Jul. 5, 2019, 11 Pages.

International Preliminary Report on Patentability for PCT Appl. No. PCT/GB2019/051209, dated Nov. 17, 2020, 7 Pages.

International Preliminary Report on Patentability for PCT Appl. No. PCT/GB2019/051210, dated Nov. 17, 2020, 9 Pages.

Notice of Allowance for U.S. Appl. No. 17/049,356, dated Oct. 6, 2021, 14 Pages.

* cited by examiner

PAYLOAD ACTIVATION DEVICE

RELATED APPLICATIONS

This application is a national phase application filed under 35 USC § 371 of PCT Application No. PCT/GB2019/051210 with an International filing date of May 1, 2019, which claims priority of GB Patent Application 1808008.5 filed May 17, 2018 and EP Patent Application 18172968.2 filed May 17, 2018. Each of these applications is herein incorporated by reference in its entirety for all purposes.

FIELD OF THE INVENTION

This specification relates generally to payload activation devices and deployable payloads comprising a payload activation device. More specifically, the specification relates to payload activation devices for activating air-launched payloads.

BACKGROUND OF THE INVENTION

Military aircraft typically carry a number of deployable payloads on hardpoints inside a weapons bay, on wings, or under the fuselage. These payloads include but are not limited to air-to-air missiles, air-to-ground missiles, free-fall bombs, guided bombs, sonobuoys, mines, depth charges, torpedoes, drones and fuel tanks.

Payloads typically require activation after release. For example, to launch an air-to-air missile stored in a weapons bay, the weapons bay doors are opened, the missile is released to drop vertically into the airflow, and once it has dropped a predetermined distance from the fuselage the weapon's engine is ignited. In other words, the missile's engine is activated. Other forms of activation include engaging a guidance system or disengaging a safety arming and fusing mechanism (SAFU).

Currently, a lanyard mechanically couples the payload to the hardpoint. The lanyard is fixedly attached to the hardpoint. As the payload falls, the lanyard becomes taught. At a predetermined tension, the lanyard pulls away from the payload, in turn causing the payload to activate. The other end of the lanyard remains fixed to the hardpoint. The remaining lanyard could then become entangled in other payloads, increase the radar cross section of the aircraft or prevent the weapons bay doors from closing properly. The present invention seeks to address this problem.

SUMMARY OF THE INVENTION

According to a first aspect of the present invention, there is provided a payload activation device, comprising: a housing; a cord, disposed within the housing, arranged to be coupled at a first end to an activation mechanism within a payload; and a retardation device coupled to the second end of the cord, wherein in a first configuration the retardation device is retained within or adjacent to the housing, and in a second configuration the retardation device is released from the housing to tauten the cord, wherein at a predetermined tension the cord actuates the activation mechanism.

As such, the payload activation can be retrofitted to existing payloads and provide the prior art functionality while not leaving material behind on an aircraft after the payload is released.

The cord may be a lanyard.

The retardation device may comprise a drogue.

The payload activation device may comprise a safety device for preventing the retardation device from entering the second configuration The safety device may comprise: a release detector; and an activation delay device, wherein the release detector is configured to activate the activation delay device when it detects the payload has been released from an aircraft, and wherein the activation delay device is configured to release the retardation device when the payload is a predetermined distance from the aircraft.

The activation delay device may be configured to release the retardation device by opening a flap in a housing of the payload activation device.

According to a second aspect of the present invention, there is provided a deployable payload for an aircraft, the deployable payload comprising a payload activation device according to the first aspect, wherein the deployable payload comprises an activation mechanism for activating the payload, the activation mechanism comprising a fixing coupled to the first end of the cord, wherein, when released, the retardation device is arranged to tauten the cord to actuate the activation mechanism when the cord is at a first predetermined tension between the first end and second end.

The fixing may be configured to release the cord when the cord is at a second predetermined tension between the first end and second end, the second tension being greater than the first tension. Alternatively, the cord may be configured to break when the cord is at a second predetermined tension between the first end and second end, the second tension being greater than the first tension.

The payload activation device may be coupled to the outside of the payload.

The deployable payload may further comprise an engine, wherein the activation mechanism is arranged to activate the engine when actuated.

The deployable payload may further comprise a safety, arming and fusing unit for preventing a warhead from being armed, wherein the activation mechanism is arranged to deactivate the safety, arming and fusing unit when actuated.

The deployable payload may be an air-launched weapon.

According to a third aspect of the present invention, there is provided a payload activation device, comprising:

a housing;

a motor disposed within the housing and coupled to an activation mechanism of the payload, the motor being configured to, when operated, actuate the activation mechanism;

a release detector for detecting whether the payload has been released from an aircraft; and an activation delay device, wherein the release detector is configured to activate the activation delay device when it detects the payload has been released from an aircraft, and wherein the activation delay device is configured to operate the motor to actuate the activation mechanism when the payload is a predetermined distance from the aircraft.

According to a fourth aspect of the present invention, there is provided a deployable payload for an aircraft, the deployable payload comprising an activation mechanism for activating the payload; and a fixing for coupling the activation mechanism to the motor, wherein the activation mechanism is arranged to be actuated by operation of the motor.

According to a fifth aspect of the present invention, there is provided a method of activating a payload, comprising:

retaining a retardation device within or adjacent to a housing in a first configuration;

releasing the retardation device from the housing in a second configuration to tauten a cord disposed in the housing, wherein at a predetermined tension the cord actuates an activation mechanism within the payload.

The method may comprise: detecting the payload has been released from an aircraft; and activating an activation delay device when the payload has been released to release the retardation device when the payload is a predetermined distance from the aircraft.

Releasing the retardation device may comprise opening a flap in a housing of the payload activation device.

According to a sixth aspect of the present invention, there is provided a method of activating a payload, comprising:

detecting whether the payload has been released from an aircraft;

activating an activation delay device when the payload has been released from an aircraft;

operate a motor to actuate an activation mechanism of the payload when the payload is a predetermined distance from the aircraft.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments will now be described, by way of non-limiting example, with reference to the accompanying drawings, in which.

DETAILED DESCRIPTION

Embodiments herein relate generally to a payload activation device. The payload activation device can be retrofitted to existing payloads or can be formed as part of payloads as they are manufactured. In brief, once the payload has fallen a safe distance from a platform, a retardation device pulls a lanyard from the payload into the airflow. Once a predetermined first tension in the lanyard has been reached, the payload is activated. Once a predetermined second tension in the lanyard has been reached, the lanyard severs from the payload.

Figure 1:
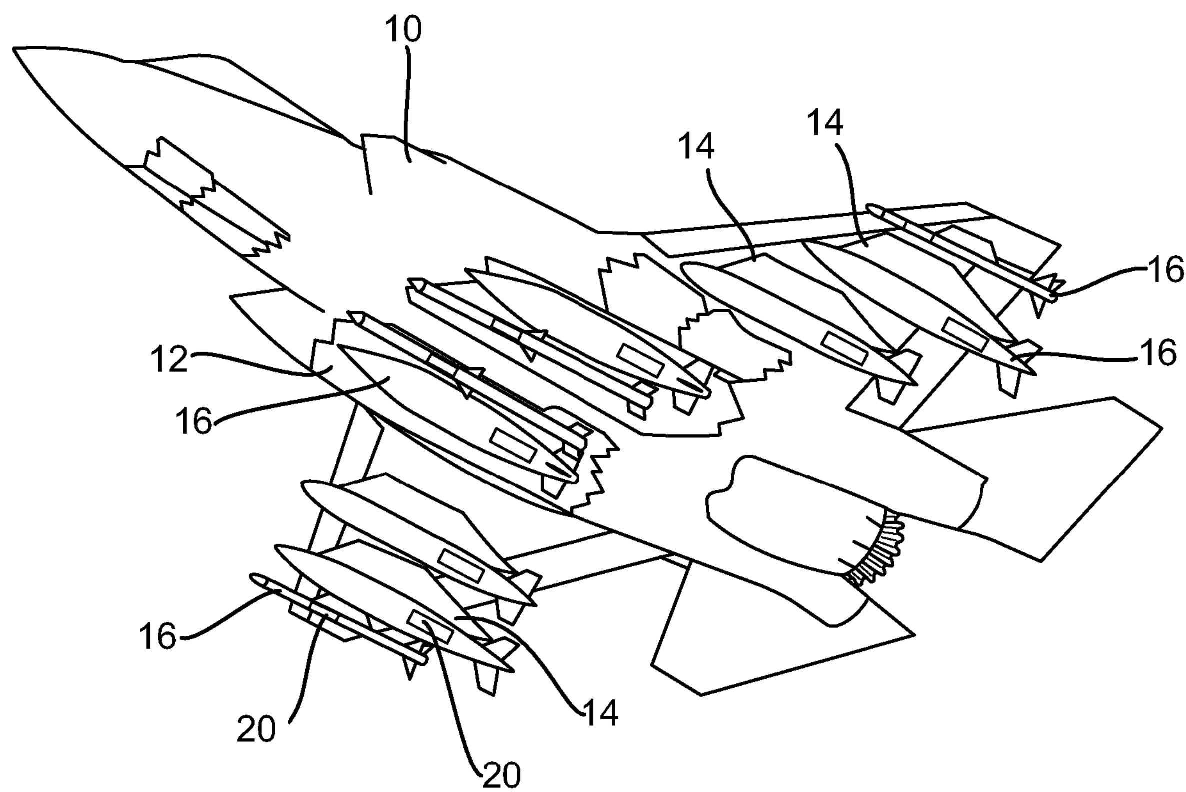
FIG. 1 is a perspective view of an aircraft having a plurality of payloads according to embodiments of the present invention.

FIG. 1 shows an aircraft 10 comprising a plurality of payloads 16. The aircraft shown is a manned fighter jet; however, it would be appreciated that the present invention could be applied to any aircraft, such as a helicopter, transport aircraft, bomber, unmanned drone or maritime patrol aircraft. Each payload 16 is attached to a hardpoint (or pylon) 14. The hardpoints 14 in the example shown in the Figure are beneath the wings of the aircraft and disposed within the aircraft's 10 weapons bays 12. In other embodiments, the hardpoints 14 may be beneath the fuselage of the aircraft 10, attached to the side of the aircraft 10 or overwing. In the embodiment shown in FIG. 1, the aircraft 10 has two weapons bays 12; however, it would be appreciated that the aircraft 10 may have more or fewer weapons bays 12. Furthermore, weapons bays 12 typically have doors that are opened prior to a payload release. For clarity, the bay doors are not shown in FIG. 1.

The payloads 16 shown are air-launched weapons. For example, the payloads include free-fall bombs and air-to-air missiles. While some payloads 16 drop from the aircraft 10 before being activated, others use the hardpoint 14 as a launch rail. Some payloads can be configured to be released using either method.

Payloads 16, whether air-launched weapons, sensors, satellites or unmanned aircraft, typically require activation after being released. In some embodiments, activation comprises igniting a motor (where the payload 16 is not launched from the hardpoint 14 itself), for example a rocket motor or ramjet. In other embodiments, activation comprises activating a guidance or control system. Activating a control system may comprise extending or deploying a control surface, such as a tail fin. In other embodiments again, activation comprises deactivating a safety, arming and fusing unit such that a warhead can be armed at a future time.

Each payload 16 requiring activation after launch comprises a payload activation device 20. In some embodiments, as shown in FIG. 1, the payload activation device 20 is affixed to the payload 16 after the payload 16 has been manufactured. Here, the payload activation device 20 may be strapped, screwed, glued, clamped or otherwise affixed in any suitable manner to the payload 16. According to other embodiments, the payload activation device 20 is part of the payload 16.

The payload activation device 20 is configured to actuate an activation mechanism, such as a mechanical switch, within the payload 16 once the payload 16 is a predetermined distance from the aircraft 10. Here, "within the payload 16" may mean part of the activation mechanism is disposed on the outer surface or housing of the payload 16. Arrangements of activation mechanisms for payloads and procedures that take place once they are actuated would be readily appreciated by the skilled person. The present invention relates to a device for actuating prior art activation mechanisms, rather an activation mechanism per se. For example, lugs and other fixings for cords (e.g. lanyards) would be readily considered by the skilled person.

Figure 2:
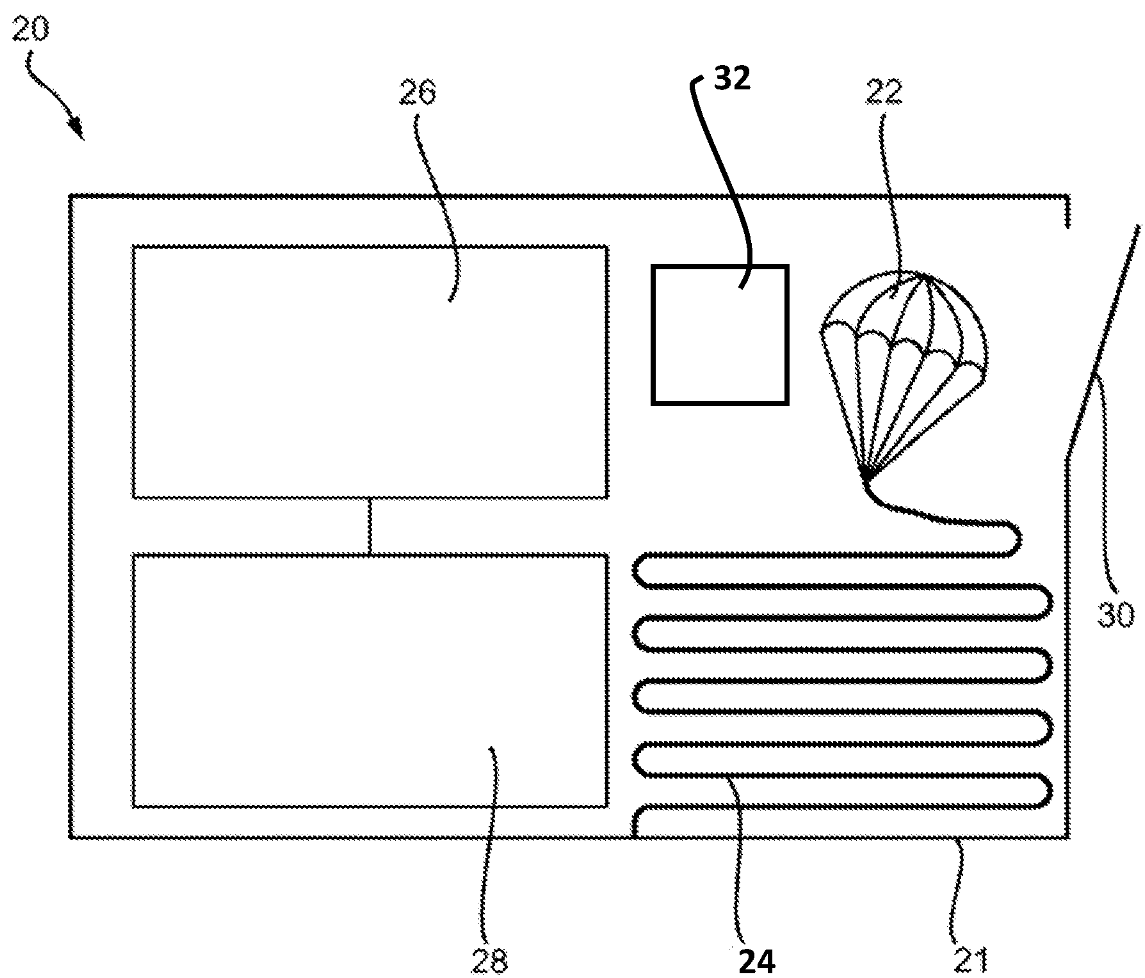
FIG. 2 is a system view of a payload activation device according to embodiments of the present invention.

The payload activation device 20 is shown in more detail in FIG. 2. In some embodiments, the payload activation device 20 includes a retardation device 22, a cord 24, and a safety device. The safety device is for preventing the retardation device 22 from being released too early and getting caught in the aircraft 10 or its slipstream. Moreover, the safety device can be configured to prevent the retardation device 22 from being released at all, and therefore the payload 16 can be dropped without ever being activated. The safety device, in some embodiments, comprises a release detector 26, an activation delay device 28, and a retaining device 30.

The retardation device 22 is coupled to the cord 24. The other end of the cord 24 is, in use, coupled to an activation mechanism within the payload 16. The cord 24 may be tied or otherwise affixed to a lug on the activation mechanism.

The activation mechanism is for activating the payload 16 when the tension in the cord 24 reaches a predetermined threshold. The predetermined threshold is less than the force required to break the cord 24 or lug, or separate the cord 24 from the retardation device 22. In some embodiments, the cord 24 is a thin metal wire. However, it would be appreciated that this is not intended to be limiting, and any suitable lightweight elongate material with high tensile strength may be used, such as bungee cord. In some embodiments, the cord 24 is in the form of a lanyard (in other words, the cord 24 comprises a continuous elongate loop). Here, the ends of lanyard are threaded through eyelets or otherwise coupled to the retardation device 22 and payload 16.

In some embodiments, the retardation device 22 comprises a drogue with a high drag coefficient. In a first mode, the retardation device 22 is stored within the housing 21 of the payload activation device 20. In a second mode, the retardation device 22 is released into the airflow outside of the payload 16 in order to pull the cord 24 out of the housing 21. The retardation device 22, having a higher drag coefficient than the payload 16, decelerates relative to the payload 16. The retardation device 22 slows one end of the cord 24 relative to the end coupled to the mechanism such that the cord 24 is tautened. In other embodiments, the retardation device 22 comprises one or more members configured to extend from a retained position, outside of the airflow, to a position within the airflow in order to pull the cord 24 out of the housing 21. For example, the one or more members, in one embodiment, are spring-loaded and configured to rotate about an axis substantially parallel to the direction of travel of the payload 16, when released by the retaining device 30, across an end surface of the housing 21 into the airflow.

In FIG. 2, the retaining device 30 is shown as a controllable door in the housing 21 of the payload activation device 20 through which the retardation device 22 can be released into the airflow. According to other embodiments, the retaining device 30 is a releasable catch for retaining the retardation device 22 within the housing 21, or for preventing the retardation device from expanding or otherwise operating to cause the cord 24 to tauten.

The retaining device 30 is operated to release the retardation device 22 a predetermined time after the payload 16 has been released from the aircraft 10. The retaining device 30 is operated by an activation delay device 28. The activation delay device 28 according to some embodiments is a timer coupled to the release detector 26. The delay set by the activation delay device may be selectable, either by the pilot during flight of the aircraft 10 or by maintenance crew when the payload 16 is being loaded onto the aircraft 10, in order to accommodate specific payload or platform release criteria.

In alternative embodiments, instead of a time, the delay may comprise a distance. For example, instead of comprising a timer, the activation delay device 28 comprises an altimeter programmed to release the retaining device 30 when the payload 16 reaches a predetermined altitude.

The release detector 26 could take any suitable form for detecting the moment that the payload 16 is released from the hardpoint 14. For example, the release detector 26 may comprise an electric circuit that is completed when the payload 16 is coupled to the hardpoint 14 but broken when the payload 16 is released from the hardpoint 14. The release detector 26 may instead receive a signal from the aircraft 10 notifying it of the imminent release of the payload 16.

In some embodiments, the activation delay device 28 and release detector 26 are not necessary. Instead, the retardation device 22 is arranged partly outside of the housing 21. Here, when the payload 16 is dropped from the aircraft 10, at least part of the retardation device 22 resists the airflow in order to extrude the cord 24. This embodiment is could be used when the payload 16 is stored in a weapons bay 12 of the aircraft 10, as the retardation device 22 may be caught in the airflow in normal flight if the payload 16 were attached to the outside of the aircraft 10.

Figure 3A:
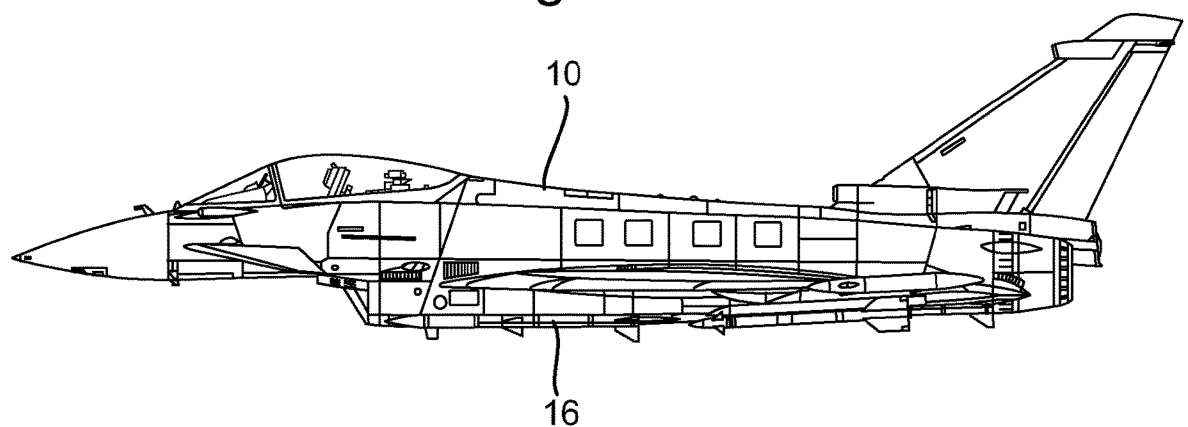
FIGS. 3*a-d* show a procedure for an aircraft releasing a payload according to embodiments of the present invention.

A process for activating the payload 16 will now be described with reference to FIGS. 3*a* through to 3*d*. The aircraft 10 shown in these Figures is a manned fighter aircraft 10 releasing a payload 16 from a fuselage shoulder hardpoint 14. The payload 16 is an air-to-air missile that is to be dropped from the aircraft 10 before having its motor ignited to drive it forwards. FIG. 3*a* shows the payload 16 coupled to the aircraft 10.

Figure 3B:
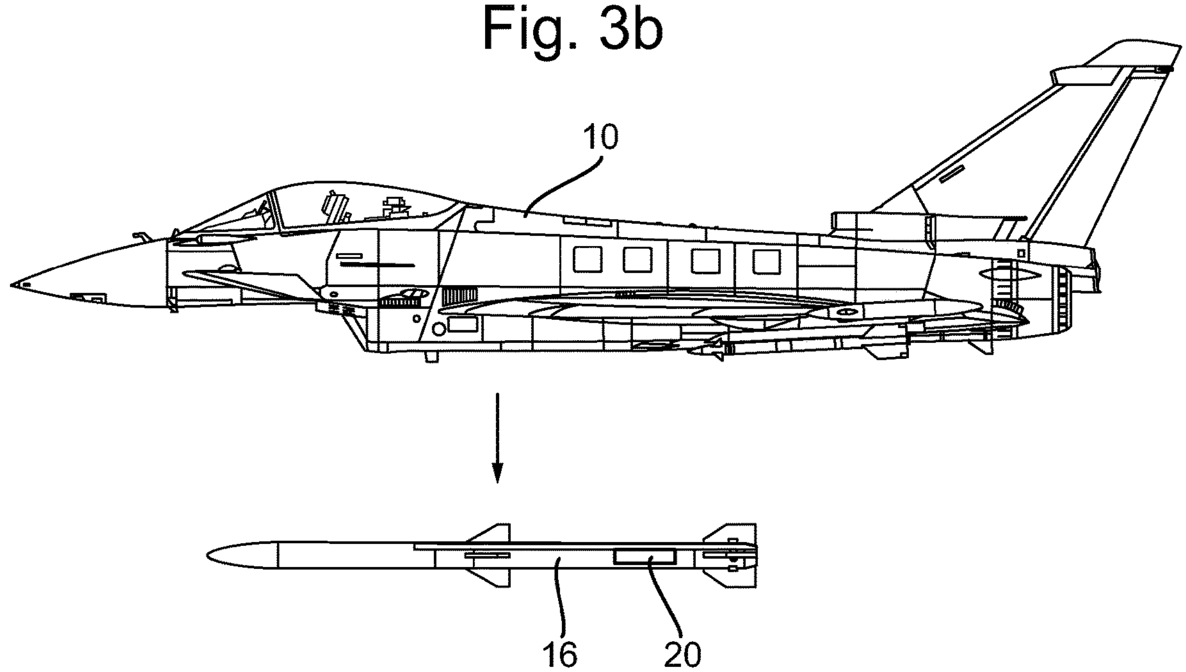

In a first step, the pilot locks the guidance system (e.g. radar seeker) of the payload 16 onto a target. When the aircraft's 10 computer indicates the aircraft 10 is within the launch acceptability region, the pilot releases the payload 16. This is shown in FIG. 3*b*. Upon immediate release of the payload 16, the release detector 26 transmits a signal to the activation delay device 28 so that the activation delay device 28 can begin the predetermined delay period. This tends to prevent the retardation device 22 from being released the moment the payload 16 is dropped, which could result in the retardation device 22 getting caught on, or affected by, the aircraft 10.

Figure 3C:
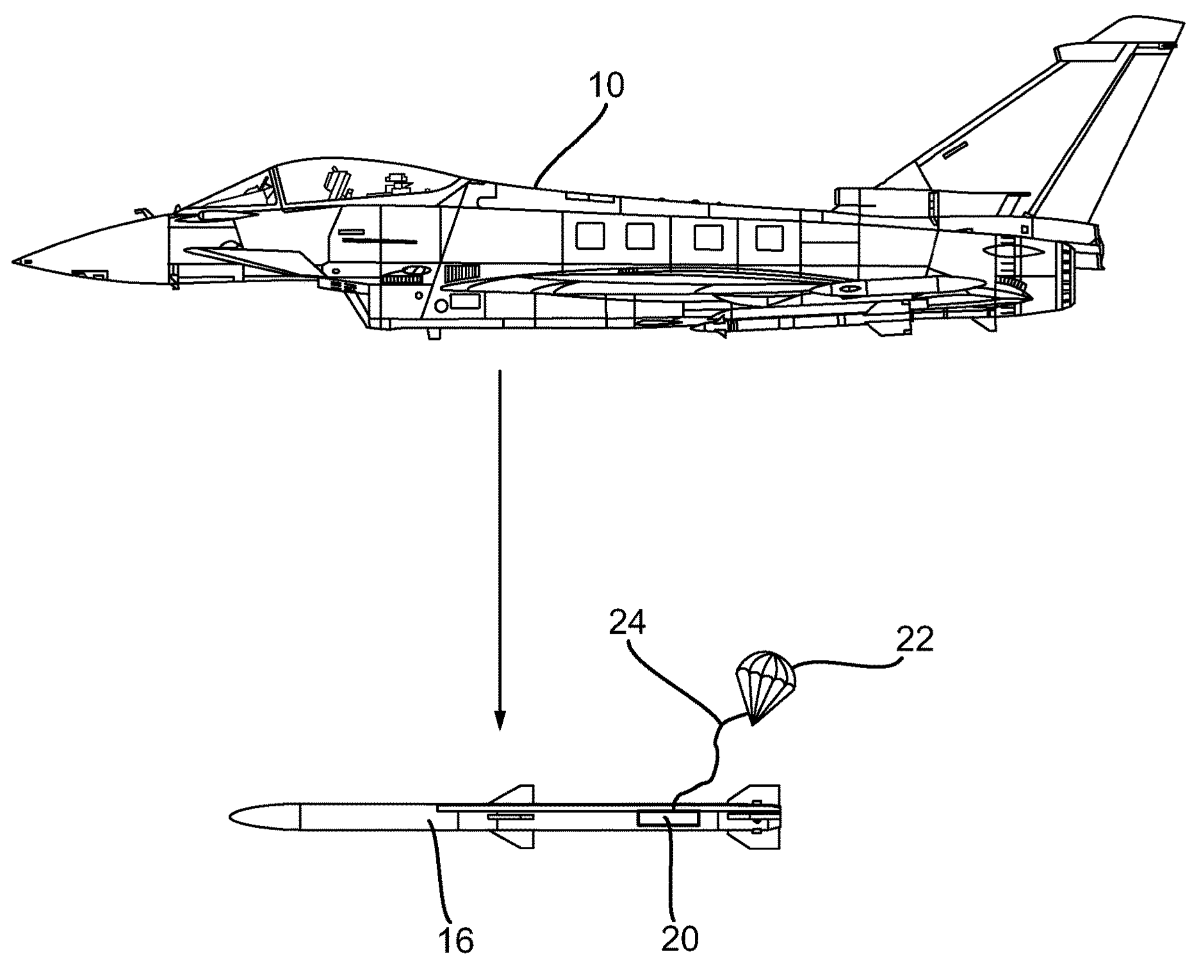

As shown in FIG. 3*c*, immediately after the predetermined delay period, the processor transmits a signal to the retaining device 30 to release the retardation device 22.

The retardation device 22, due to its relatively high drag coefficient, moves through the air slower than the payload 16. Therefore, the retardation device 22 pulls the cord 24 out of the housing 21. In other words, the retardation device 22 extrudes the cord 24.

When the tension across the cord's 24 length reaches a predetermined threshold, an activation mechanism within the payload 16 and coupled to one of the cord's 24 ends is actuated in order to activate the payload 16. Activating the payload 16 may include deactivating a SAFU, activating a motor, or causing flight controls to extend from a housed position. Here, "within the payload 16" may mean part of the activation mechanism is disposed on the outer surface or housing of the payload 16.

Figure 3D:
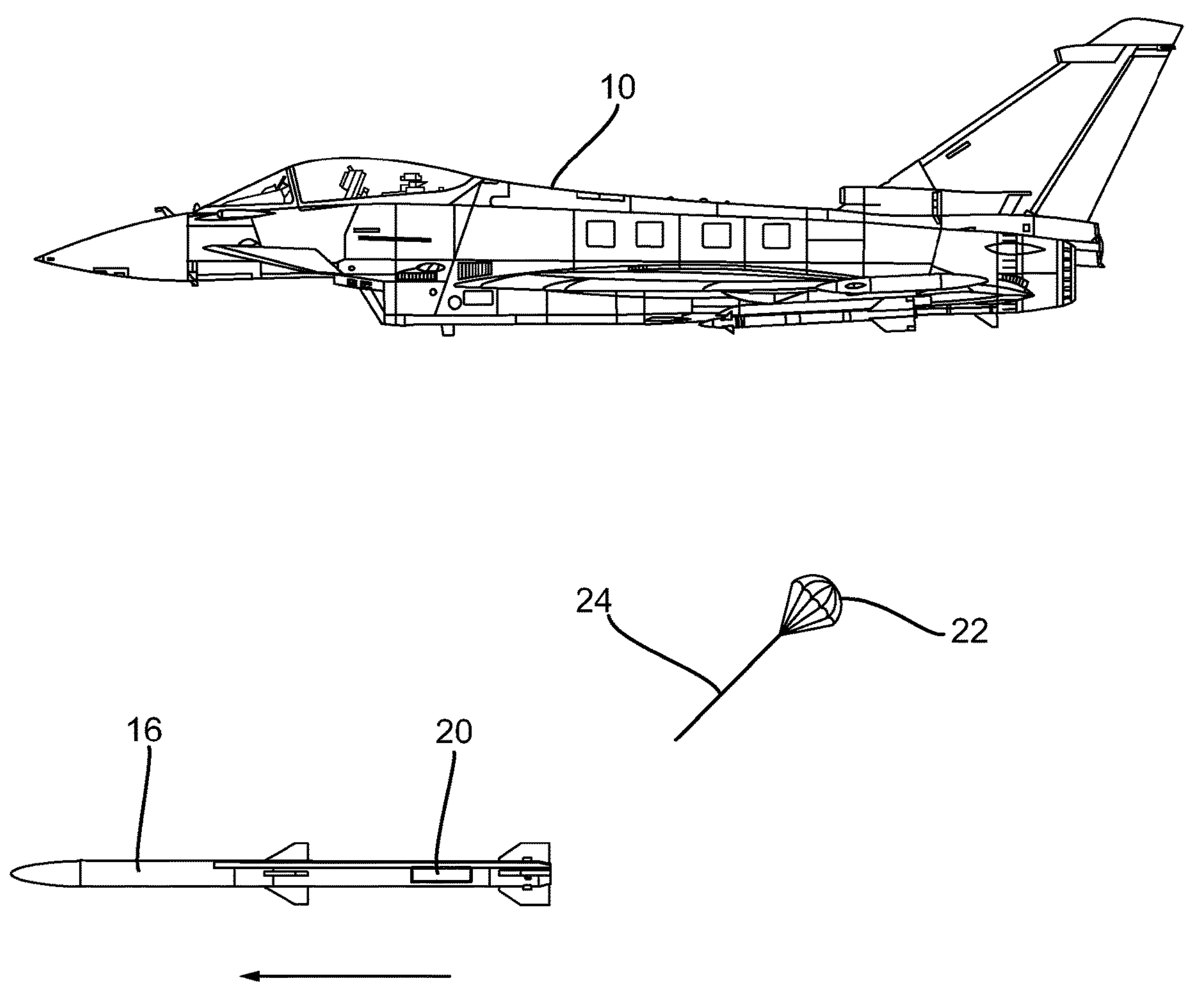

As shown in FIG. 3*d*, at a second predetermined tension, the cord 24 breaks away from the activation mechanism within the payload 16. To facilitate this, in some embodiments, the cord 24 snaps at a point along its length. In other embodiments, the lug or other means for attaching the cord 24 to the activation mechanism breaks or otherwise releases the cord 24 at the second predetermined tension. In other words, in some embodiments, the lug is frangible.

It would be readily understood by the skilled person that the steps of locking onto a target and computing a launch acceptability region are not necessary where the payload 16 is not a weapon, or where a weapon is to be disposed of without arming or attacking a target. In the latter case, the pilot of the aircraft 10 sets the delay of the activation delay device 28 to a period of time greater than the time it would take for the payload 16 to reach the ground. Alternatively, where the pilot does not want the payload 16 to activate before it reaches the ground, the pilot may opt to release the payload 16 such that the activation delay device 28 will not activate, such as by inhibiting the release detector 26.

Therefore, according to the present invention, no part of the cord 24 is retained on the aircraft 10. Therefore, a potential hazard whereby a retained part of the cord 24 could snag on an adjacent structure or payload 16 tends to be avoided.

According to other embodiments, the payload activation device 20 comprises a release detector 26 and activation delay device 28 as previously described. A servo is electrically coupled to the activation delay device 28. The servo is mechanically coupled to the activation mechanism of the payload 16. When the payload 16 is a safe distance from the aircraft 10 (in other words, when the payload 16 has fallen a predetermined distance or for a predetermined amount of time), the servo is operated to actuate the activation mechanism and activate the payload 16. Using a servo coupled to the activation mechanism within the payload 16 is just one means by which the payload activation device 20 can be provided as an aftermarket upgrade to existing payloads.

According to some embodiments, the payload activation device 20 includes a processor (or controller) providing the features of at least the activation delay device 28.

The solution provided by the present invention not only provides an advantage in that it can be retrofitted with little modification to payloads already in existence, but it provides a solution to the problem of floating lanyards that involves little in the way of complexity or extra weight.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A deployable payload for an aircraft, the deployable payload comprising:

a payload activation device comprising:

a housing;

a cord disposed within the housing and arranged to be coupled, at a first end, to an activation mechanism within a payload; and a retardation device coupled to a second end of the cord, wherein, in a first configuration, the retardation device is retained within or adjacent to the housing, and, in a second configuration, the retardation device is released from the housing to tauten the cord, and wherein, at a first predetermined tension, the cord is configured to actuate the activation mechanism, wherein the deployable payload comprises the activation mechanism for activating the payload, the activation mechanism being releasably coupled to the first end of the cord, wherein, when released, the retardation device is arranged to tauten the cord to actuate the activation mechanism when the cord is at the first predetermined tension between the first end and second end, and wherein the cord is configured to separate from the activation mechanism when the cord is at a second predetermined tension between the first end and second end, the second tension being greater than the first tension.

2. The deployable payload according to claim 1, wherein the cord is configured to break when the cord is at the second predetermined tension between the first end and second end, the second tension being greater than the first tension.

3. The deployable payload according to claim 1, wherein the payload activation device is coupled to the outside of the payload.

4. The deployable payload according to claim 1, further comprising an engine, wherein the activation mechanism is arranged to activate the engine when actuated.

5. The deployable payload according to claim 1, further comprising a safety, arming and fusing unit for preventing a warhead from being armed, wherein the activation mechanism is arranged to deactivate the safety, arming and fusing unit when actuated.

6. The deployable payload according to claim 1, wherein the deployable payload is an air-launched weapon.

* * * * *